(12) United States Patent
Lin et al.

(10) Patent No.: US 11,320,381 B2
(45) Date of Patent: May 3, 2022

(54) DETERIORATION DETECTING SYSTEM AND METHOD FOR SEMICONDUCTOR PROCESS KITS

(71) Applicant: TOP TECHNOLOGY PLATFORM CO., LTD., Hsinchu (TW)

(72) Inventors: Chyuan-Ruey Lin, Hsinchu (TW); Feng-Min Shen, Hsinchu (TW); Hung-Chia Su, Hsinchu (TW)

(73) Assignee: Top Technology Platform Co., Ltd., Hsinchu (TW)

( * ) Notice: Subject to any disclaimer, the term of this patent is extended or adjusted under 35 U.S.C. 154(b) by 0 days.

(21) Appl. No.: 17/030,520

(22) Filed: Sep. 24, 2020

(65) Prior Publication Data

US 2022/0034814 A1    Feb. 3, 2022

(30) Foreign Application Priority Data

Jul. 30, 2020    (TW) .................................. 109125708

(51) Int. Cl.
*G01N 21/65* (2006.01)
*G01N 21/95* (2006.01)

(52) U.S. Cl.
CPC ............. *G01N 21/65* (2013.01); *G01N 21/95* (2013.01); *G01N 2201/06113* (2013.01); *G01N 2201/08* (2013.01)

(58) Field of Classification Search
CPC .... G01N 21/65; G01N 21/95; G01N 2201/08; G01N 2201/06113
See application file for complete search history.

(56) References Cited

U.S. PATENT DOCUMENTS

| | | | |
|---|---|---|---|
| 2011/0066997 A1* | 3/2011 | O'Riordan | G06F 30/392 716/136 |
| 2019/0063678 A1* | 2/2019 | Ganiger | G01N 33/2888 |
| 2019/0229695 A1* | 7/2019 | Luo | H03H 7/0115 |

\* cited by examiner

*Primary Examiner* — Hina F Ayub
(74) *Attorney, Agent, or Firm* — Muncy, Geissler, Olds & Lowe, P.C.

(57) ABSTRACT

A deterioration detecting system for semiconductor process kits has a Raman spectrometer, an optical detecting unit, a Raman spectra database unit, and a controlling-computing unit. The optical detecting unit and the controlling-computing unit are both coupled to the Raman spectrometer. The Raman spectrometer detects a semiconductor process kit under detection through the optical detecting unit to obtain a scatter light having an excited Raman spectrum signal. The Raman spectra database unit stores a plurality of Raman spectrum signals corresponding to multiple known use hours, multiple known materials, multiple known material compounds, or multiple known material deterioration state, of the semiconductor process kit under detection. The controlling-computing unit compares the excited Raman spectrum signal and a threshold of the Raman spectrum signals accessed from the Raman spectra database unit and outputs a judgment signal relating to the deterioration state of the semiconductor process kit under detection.

10 Claims, 4 Drawing Sheets

DETERIORATION DETECTING SYSTEM AND METHOD FOR SEMICONDUCTOR PROCESS KITS

TECHNICAL FIELD

The present invention relates to a detecting system and method and particularly to a deterioration detecting system and method for semiconductor process kits.

BACKGROUND

The production equipment in semiconductor manufacturing plants accounts for about 80% of the total cost. Not only the production equipment uses a large variety of process kits and highly costs, but also the frequency of replacement of most of the process kits is difficult to accurately predict. It has been one of the problems facing the semiconductor industry to consider both the equipment proper rate and the cost control.

The semiconductor manufacturing yield rate is greatly affected by the proper rate of the semiconductor process kits of the semiconductor production equipment. Any minute defects of the semiconductor process kits or any tiny molecules remaining on the surface of the semiconductor process kits may become a pollution source in the semiconductor manufacturing process. In the high-end manufacturing processes, due to the shrinkage of the line width, the tiny molecules that previously unaffected the yield rate may now seriously affect the semiconductor manufacturing quality. Therefore, the semiconductor process kits must be cleaned and tested after a period of use.

However, these semiconductor process kits may be deteriorated and unusable after a certain number of use hours and could not meet the high-end process requirements even after being cleaned. At this time, the semiconductor process kits must be replaced to avoid the generation of any pollution sources. Nowadays, the replacement timing of the semiconductor process kits is usually obtained from experience or through testing tools. However, relying solely on the experience for the replacement usually resulted in that the semiconductor process kits are often decommissioned when they are still in a usable state, which has a disadvantage of low utilization efficiency; on the other hand, the currently available testing tools can only measure the size change of these process kits. The property change of the semiconductor process kits before and after the occurrence of micro-defects cannot be accurately known. In other words, in the high-end manufacturing processes, there is still no solution to accurately determine the quality of the semiconductor process kits undergoing a certain number of use hours or cleaning hours.

To solve this problem and meet the high-end process requirements, there is a need for a deterioration detecting system and method for semiconductor process kits to accurately detect out the quality of a semiconductor process kit that has been used for a period of time or has been cleaned.

SUMMARY

In view of the above issues, this application proposes a deterioration detecting system and method for semiconductor process kits.

In one implementation aspect, the present application proposes a deterioration detecting system for semiconductor process kits. In one embodiment, the system includes a Raman spectrometer, an optical detecting unit, a Raman spectra database unit, and a controlling-computing unit. The optical detecting unit is connected to the Raman spectrometer to guide a light beam emitted from the Raman spectrometer to be projected onto at least one targeted area of a semiconductor process kit under detection and to guide a light scattered at the targeted area having an excited Raman spectrum signal to be received by the Raman spectrometer. The Raman spectra database unit is provided to store a plurality of Raman spectrum signals corresponding to a plurality of known use hours, a plurality of known materials, a plurality of known material compounds, or a plurality of known deterioration states of the materials of the semiconductor process kit under detection. The controlling-computing unit is connected to the Raman spectrometer and the Raman spectra database unit to receive the excited Raman spectrum signal from the Raman spectrometer and to access the Raman spectrum signals stored in the Raman spectra database unit and to compare the excited Raman spectrum signal with a threshold of the accessed Raman spectrum signals and to output a judgment signal relating to the deterioration state of the semiconductor process kit under detection.

In one embodiment, the semiconductor process kit may be made of an inorganic material. Preferably, the inorganic materials may be silicon, quartz, aluminum oxide, yttrium oxide, or yttrium aluminum garnet.

In one embodiment, the proposed system may further include a display unit which is connected to the controlling-computing unit to receive the judgment signal and to display a judgment result relating to the deterioration state of the semiconductor process kit under detection according to the judgment signal.

In one embodiment, the judgment result relating to the deterioration state of the semiconductor process kit under detection may be one of the following: the semiconductor process kit under detection is still usable, the semiconductor process kit under detection should not be used, the remaining use hours of the semiconductor process kit, the deterioration percentage of the semiconductor process kit under detection, the compound composition of the semiconductor process kit under detection, and the material composition of the semiconductor process kit under detection.

In one embodiment, at least two targeted areas of the semiconductor process kit under detection are projected with the light beam emitted from the Raman spectrometer.

In one embodiment, the light beam projected to the targeted area may focus on a circular spot.

In another implementation aspect, the present application proposes a deterioration detecting method for semiconductor process kits. In one embodiment, the method includes the following steps: providing a Raman spectrometer; connecting an optical detecting unit adapted to the Raman spectrometer to the Raman spectrometer; connecting a controlling-computing unit adapted to the Raman spectrometer to the Raman spectrometer; connecting a Raman spectra database unit to the controlling-computing unit with the Raman spectra database unit storing a plurality of Raman spectrum signals corresponding to a plurality of known use hours, a plurality of known materials, a plurality of known material compounds, or a plurality of known deterioration states of the materials, of a semiconductor process kit under detection; detecting the semiconductor process kit under detection with the optical detecting unit; and comparing an excited Raman spectrum signal of a light scattered at the semiconductor process kit under detection with a threshold of the Raman spectrum signals accessed from the Raman spectra database unit.

In one embodiment, the proposed method may further include a step of judging the deterioration state of the semiconductor process kit under detection according to the comparison.

In one embodiment, the proposed method may further include a step of inputting the current use hours, the Raman spectrum of the material, the Raman spectrum of the material compounds, the deterioration parameters of the material, or the excited Raman spectrum signal, of the semiconductor process kit under detection into the Raman spectra database unit.

In summary, the proposed deterioration detecting system and method for semiconductor process kits described according to the present application utilize the optical detecting unit, the controlling-computing unit, and the Raman spectra database unit that are adapted to the Raman spectrometer to make detection. In this way, the deterioration state of the semiconductor process kits which has been used for a certain of hours, the deterioration state of the semiconductor process kits undergoing various degrees of material deterioration, the deterioration state of the semiconductor process kits having various materials or various material compounds, the material composition of the semiconductor process kits, and the material compound composition of the semiconductor process kits could be detected out in a precise and effective manner. Moreover, the current detecting results, the Raman spectrum corresponding to the material composition, the Raman spectrum corresponding to the material compound, and the material deterioration parameters may be further inputted into the Raman spectra database unit to serve as references for comparison and judgment in the next detection and thereby to increase the accuracy of the detection. Therefore, the proposed deterioration detecting system and method for semiconductor process kits have capability of precisely determining the good and bad of a semiconductor process kit to satisfy the high-end process requirements.

BRIEF DESCRIPTION OF DRAWINGS

The following detailed descriptions, given by way of example, and not intended to limit the present invention solely thereto, will be best be understood in conjunction with the accompanying figures.

DETAILED DESCRIPTION OF THE EMBODIMENTS

Figure 1:
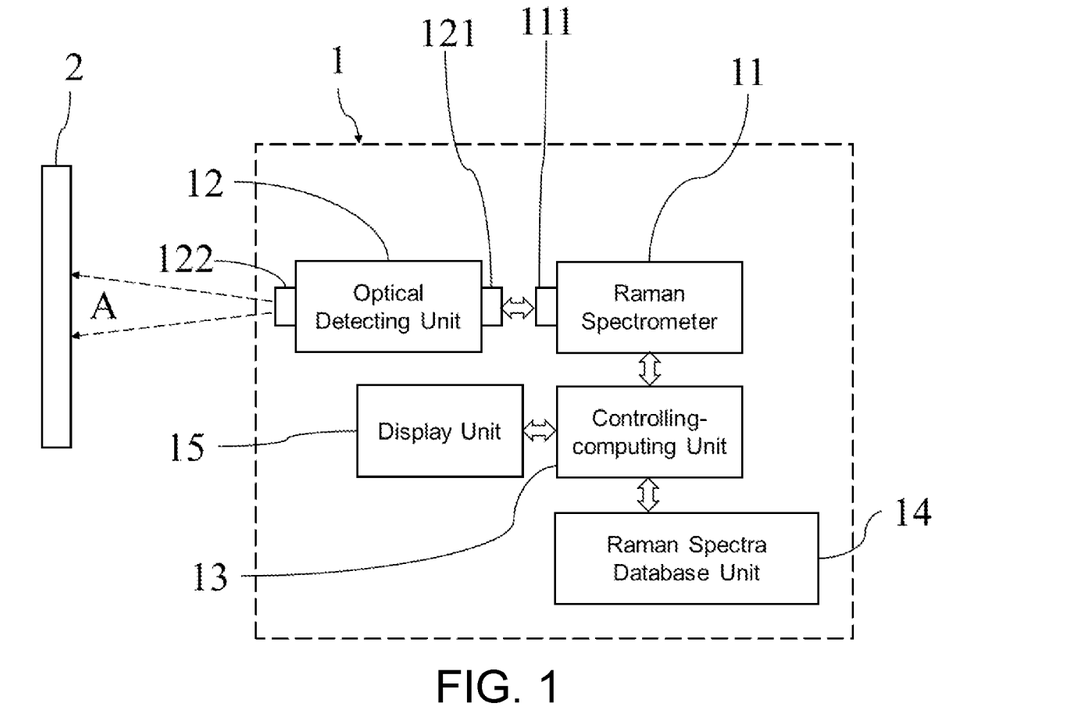
FIG. 1 is a schematic diagram showing a deterioration detecting system for semiconductor process kits according to one embodiment of the invention in the present application.

FIG. 1 is a schematic diagram showing a deterioration detecting system for semiconductor process kits according to one embodiment of the invention in the present application. Referring to FIG. 1, in the present invention, a deterioration detecting system 1 for semiconductor process kits has a Raman spectrometer 11, an optical detecting unit 12 adapted to the Raman spectrometer 11, a controlling-computing unit 13 adapted to the Raman spectrometer 11, and a Raman spectra database unit 14 adapted to the computing-controlling unit 13. The optical detecting unit 12 is an optical device or system including various of optical elements such as condensing lens, beam splitter, and filters. The kind, number, and optical path of the optical elements arranged inside the optical detecting unit 12 will not be described in detail and are not limited herein as long as the optical detecting unit 12 is adapted to the Raman spectrometer 11 to perform Raman spectrum detection on a semiconductor process kit 2. The controlling-computing unit 13 has capability of computation including comparison operation, logic operation, analysis operation, and judgment operation. The controlling-computing unit 13 is also capable of controlling other units such as the Raman spectrometer 11 and the Raman spectra database unit 14. The controlling-computing unit 13 may be, for example, a microprocessor. In the present invention, the kind of the controlling-computing unit 13 is not limited herein as long as the controlling-computing unit 13 is adapted to the Raman spectrometer 11 to perform control on other units and perform computation on the detected Raman spectrum signals. The Raman spectra database unit 14 is provided to store a plurality of Raman spectrum signals corresponding to a plurality of known use hours, a plurality of known materials, a plurality of known material compounds, or a plurality of known deterioration states of the materials of various semiconductor process kits including the semiconductor process kit under detection. The Raman spectra database unit 14 has capacity of storing data and may be implemented as a memory, hard disk, or a cloud storage system. The type of the Raman spectra database unit 14 is not limited herein as long as the Raman spectra database unit 14 is adapted to the controlling-computing unit 13 and other units in the deterioration detecting system to receive, output and store Raman spectrum data.

In the present invention, the mentioned semiconductor process kits are the parts used in the semiconductor manufacturing process. In most cases, the semiconductor process kits are made of an inorganic material. The semiconductor process kits may include but not limited to the Si rings applied in the etching process; the Quartz parts such as Quartz tube, Quartz cassette, Quartz ring, Quartz cell, and Quartz heater applied in the etching or deposition process; the ceramic parts such as that of $Al_2O_3$ applied in a semiconductor chamber or with a wafer transportation; and the coatings, such as of $Y_2O_3$ or YAG, applied in the interior of a semiconductor device or the protective parts with resistance to plasma etching applied inside a semiconductor chamber.

In the present embodiment, the deterioration detecting system 1 for semiconductor process kit utilizes the Raman spectrometer 11 and the optical detecting unit 12, which is adapted to the Raman spectrometer 11, to make deterioration detection of the semiconductor process kit 2 which is under detection. The light projection of the Raman spectrometer 11 onto the semiconductor process kit 2 is accomplished by the optical detecting unit 12. In one embodiment, the optical detecting unit 12 is connected to the Raman spectrometer 11; and the Raman spectrometer 11 and the Raman spectra database unit 14 are all connected to the controlling-computing unit 13.

Referring to FIG. 1, in one embodiment, the Raman spectrometer 11 has a first optical coupling port 111 and the Raman spectrometer 11 emits a light beam such as a laser light beam out of the Raman spectrometer 11 through the first optical coupling port 111. The emitted light beam passes the optical detecting unit 12 and is projected on the semiconductor process kit 2 under detection. Then, the semiconductor process kit 2 scatters a light with an exciting Raman spectrum signal which is then received by the Raman spectrometer 11 and the exciting Raman spectrum signal of the scattered light is measured. The optical detecting unit 12 has a second optical coupling port 121 and an optical projecting port 122 which are disposed on two opposed ends of the optical detecting unit 12. When a detection is performed, the second optical coupling port 121 is connected to the first optical coupling port 111 of the Raman spectrometer 11 while the optical projecting port 122 faces the semiconductor process kit 2 under detection to guide the light beam emitted from the Raman spectrometer 11 to be projected onto the semiconductor process kit 2. The forementioned connection between the Raman spectrometer 11 and the optical detecting unit 12 includes direct connection and indirect connection. In one embodiment, the optical detecting unit 12 may include two optical fibers of which one is used to guide the light beam emitted from the Raman spectrometer 11 to pass the optical projecting port 122 and reach a targeted area A of the semiconductor process kit 2 under detection while the other one is used to guide the light scattered at the targeted area A having an excited Raman spectrum signal to be received by the optical detecting unit 12 through the optical projecting port 122 and then received by the Raman spectrometer 11. The targeted area A is an area to effectively receive the light beam emitted from the Raman spectrometer 11 and then projected onto the semiconductor process kit 2 under detection through the optical projecting port 122. In one embodiment, the light beam projected to the targeted area may focus on a circular spot.

Referring to FIG. 1, in one embodiment, the Raman spectra database unit 14 is connected to the controlling-computing unit 13. The Raman spectra database unit 14 stores a plurality of second Raman spectrum signals corresponding to a plurality of known use hours such as 50, 100, 150 . . . 500 hours of the semiconductor process kit 2 under detection, a plurality of known materials of the semiconductor process kit 2 under detection, a plurality of known material compounds of the semiconductor process kit 2 under detection, or a plurality of known deterioration states or parameters of the materials of the semiconductor process kit 2 under detection. The deterioration parameters are the parameters used to represent the degree or percentage of the deterioration.

Figure 2:
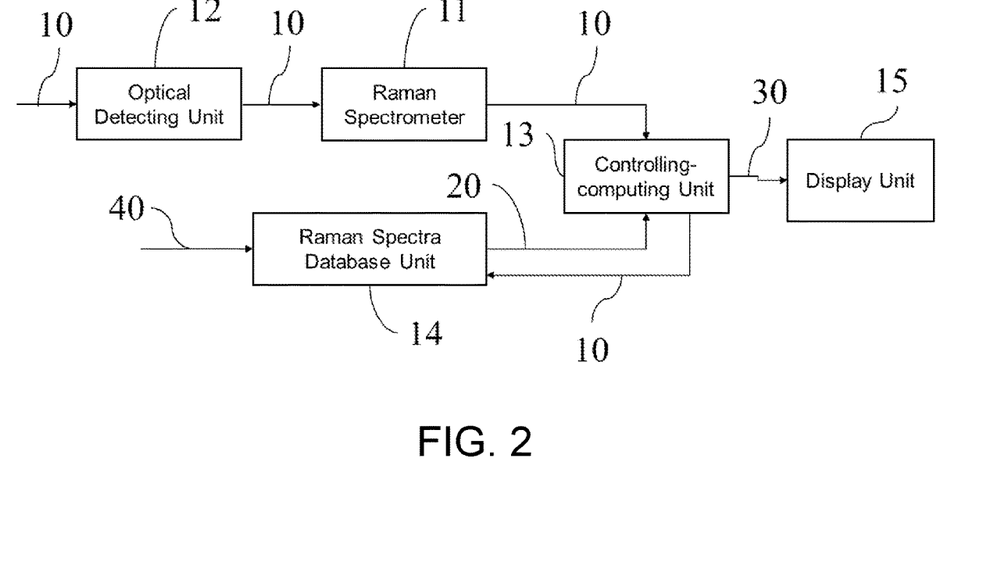
FIG. 2 is a schematic diagram showing the relationship between the signals transmitting between the elements of the deterioration detecting system of FIG. 1.

FIG. 2 is a schematic diagram showing the relationship between the signals transmitting between the elements of the deterioration detecting system of FIG. 1. Referring to FIG. 1 and FIG. 2, in one embodiment, the controlling-computing unit 13 is connected to the Raman spectrometer 11 and the Raman spectra database unit 14. The Raman spectrometer 11 receives the excited Raman spectrum signal 10 through the optical detecting unit 12 from the targeted area A of the semiconductor process kit 2 under detection. The controlling-computing unit 13 receives the excited Raman spectrum signal 10 from the Raman spectrometer 11. The controlling-computing unit 13 accesses the Raman spectrum signal 20 stored in the Raman spectra database unit 14. The controlling-computing unit 13 compares the excited Raman spectrum signal 10 with a threshold of the accessed Raman spectrum signals 20 and then outputs a judgment signal 30 relating to the deterioration state of the semiconductor process kit 2 under detection, the material composition of the semiconductor process kit 2 under detection, or the compound composition of the semiconductor process kit 2 under detection. For example, the deterioration state may be remaining use hours of the semiconductor process kit 2 or critical values of the deterioration parameters. In one embodiment, each of the detected excited Raman spectrum signal 10 may be further inputted into the Raman spectra database unit 14 via the controlling-computing unit 13 to make each of the detected excited Raman spectrum signals 10 become one of the Raman spectrum signal 20 stored in the Raman spectra database unit 14. Besides, other data 40 including but not limited to the Raman spectrum corresponding to the current use hours of the semiconductor process kit 2 under detection, the deterioration parameter or percentage of the material of the semiconductor process kit 2 under detection, the material of the semiconductor process kit 2 under detection, or the material compound of the semiconductor process kit 2 under detection may be inputted into the Raman spectra database unit 14 by other means. In this case, the Raman spectrum data stored in the Raman spectra database unit 14 can be gradually accumulated.

Referring to FIG. 1 and FIG. 2, in another exemplified aspect, the deterioration detecting system 1 for semiconductor process kits may further include a display unit 15. In one embodiment, the display unit 15 is connected to the controlling-computing unit 13 to receive the judgment signal 30 outputted from the controlling-computing unit 13 and to display a judgment result relating to the deterioration state of the semiconductor process kit 2 under detection according to the judgment signal 30. The judgment result relating to the deterioration state of the semiconductor process kit 2 under detection may be that the semiconductor process kit 2 under detection is still usable, the semiconductor process kit 2 under detection should not be used, the remaining use hours (e.g. 100 hrs.) of the semiconductor process kit 2, the deterioration percentage of the semiconductor process kit 2 under detection, the compound composition of the semiconductor process kit 2 under detection, and the material composition of the semiconductor process kit 2 under detection. The display unit 15 may be any well-known display devices including but not limited to LCD and LED display devices.

Figure 3:
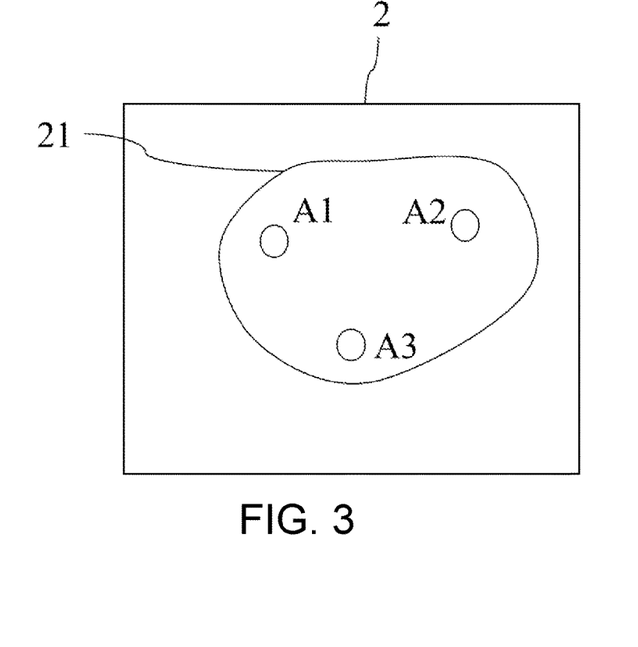
FIG. 3 is a diagram schematically showing a plurality of targeted areas in a plane of a semiconductor process kit under detection of the deterioration detecting system according to one embodiment of the invention in the present application.

FIG. 3 is a diagram schematically showing a plurality of targeted areas in a plane of a semiconductor process kit under detection of the deterioration detecting system according to one embodiment of the invention in the present application. Referring to FIG. 1 and FIG. 3, in the present invention, the size of the semiconductor process kit 2 under detection may be large or small and is not limited herein, while the area of the light beam projected onto the targeted area of the semiconductor process kit 2 under detection depends on the caliber of the optical projecting port 122 of the optical detecting unit 12 and the adjustable focal length of the optical detecting unit 12. When the size of the to-be-detected area 21 of the semiconductor process kit 2 is larger than the caliber of the optical projecting port 122, there may be a need to detect more than one targeted areas such as the discrete targeted areas A1, A2, A3 as shown in FIG. 3 to ensure the effectiveness of the detection results. The number of the targeted areas depends on the size of the to-be-detected area 21 and may increase with the size increase of the to-be-detected area 21. When the size of the to-be-detected area 21 is smaller than the caliber of the optical projecting port 122, only one targeted area may be enough. The so-called to-be-detected area 21 is an area of the semiconductor process kit 2 under detection at which the highest deterioration rate occurs. For example, the to-be-detected area 21 may be the area frequently applied with plasma etching in a semiconductor process. According to the actual requirements, the targeted areas A1, A2, A3 as shown in FIG. 3 may be same or different in size and preferably be same.

Figure 4:
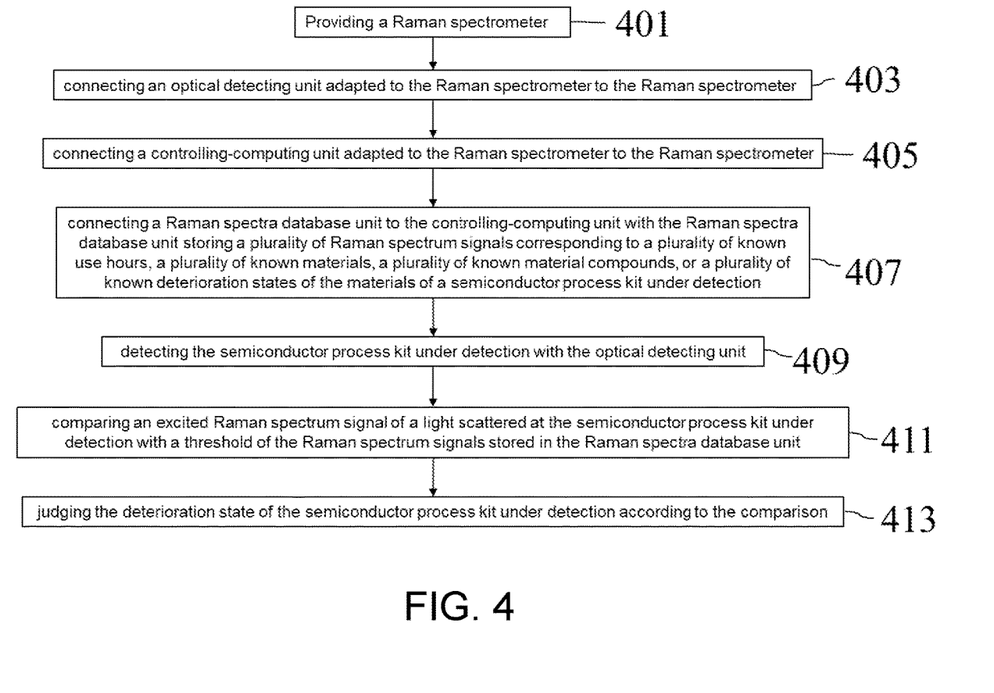
FIG. 4 is a flow chart showing a deterioration detecting method for semiconductor process kits according to one embodiment of the invention in the present application.

FIG. 4 is a flow chart showing a deterioration detecting method for semiconductor process kits according to one embodiment of the invention in the present application. Referring to FIG. 4, in one embodiment, the deterioration detecting method for semiconductor process kits includes the following steps of which the implementation is not limited to the description order. As long as the object of the present invention can be achieved, these steps may be implemented in another order.

Step 401: providing a Raman spectrometer. As shown in FIG. 1, in one embodiment, a Raman spectrometer 11 is provided.

Step 403: connecting an optical detecting unit adapted to the Raman spectrometer to the Raman spectrometer. In one embodiment, as shown in FIG. 1, connecting an optical detecting unit 12 to the Raman spectrometer 11. The optical detecting unit 12 has a second optical coupling port 121 and an optical projecting port 122 which are disposed on two opposed ends of the optical detecting unit 12, wherein the second optical coupling port 121 is connected to the first optical coupling port 111 of the Raman spectrometer 11 while the optical projecting port 122 faces the semiconductor process kit 2 under detection to guide the light beam emitted from the Raman spectrometer 11 to be projected onto the semiconductor process kit 2.

Step 405: connecting a controlling-computing unit adapted to the Raman spectrometer to the Raman spectrometer. As shown in FIG. 1, in one embodiment, the controlling-computing unit 13 is in connection with the Raman spectrometer 11.

Step 407: connecting a Raman spectra database unit to the controlling-computing unit with the Raman spectra database unit storing a plurality of Raman spectrum signals corresponding to a plurality of known use hours of the semiconductor process kit under detection, a plurality of known materials of the semiconductor process kit under detection, a plurality of known material compounds of the semiconductor process kit under detection, or a plurality of known deterioration states or parameters of the materials of the semiconductor process kit under detection. In one embodiment, as shown in FIG. 1 and FIG. 2, the Raman spectra database unit 14 is connected to the controlling-computing unit 13 wherein the Raman spectra database unit 14 stores a plurality of Raman spectrum signals corresponding to a plurality of known use hours of a variety of semiconductor process kits, a plurality of known materials of a variety of semiconductor process kits, a plurality of known material compounds of a variety of semiconductor process kits, or a plurality of known deterioration states or parameters of the materials of a variety of semiconductor process kits. The semiconductor process kits include the semiconductor process kit 2 under detection. In other words, these stored Raman spectrum signals includes the Raman spectrum signals 20 corresponding to a plurality of known use hours of the semiconductor process kit 2 under detection, a plurality of known materials of the semiconductor process kit 2 under detection, a plurality of known material compounds of the semiconductor process kit 2 under detection, or a plurality of known deterioration states or parameters of the materials of the semiconductor process kit 2 under detection.

Step 409: detecting the semiconductor process kit under detection with the optical detecting unit. In one embodiment, as shown in FIG. 1 and FIG. 2, the Raman spectrometer 11 emits a light beam, such as a laser beam, through the first optical coupling port 111, and the emitted light beam is guided by the optical detecting unit 12 and then projected onto the semiconductor process kit 2 under detection to scatter a light with an excited Raman spectrum signal. The excited Raman spectrum of the scattered light is measured by the Raman spectrometer 11. Specifically, the light beam emitted from the Raman spectrometer 11 passes through the optical projecting port 122 and is projected onto the targeted area A of the semiconductor process kit 2, and the light scattered at the targeted area A of the semiconductor process kit 2 having an excited Raman spectrum signal is guided back to the Raman spectrometer 11 through the optical projecting port 122.

Step 411: comparing an excited Raman spectrum signal of a light scattered at the semiconductor process kit under detection with a threshold of the Raman spectrum signals stored in the Raman spectra database unit. In one embodiment, as shown in FIG. 1 and FIG. 2, the controlling-computing unit 13 receives the excited Raman spectrum signal 10 from the Raman spectrometer 11 and accesses the Raman spectrum signals 20 stored in the Raman spectra database unit 14, and then the controlling-computing unit 13 compares the excited Raman spectrum signal 10 with a threshold of the Raman spectrum signals 20.

Step 413: judging the deterioration state of the semiconductor process kit under detection according to the comparison. As shown in FIG. 1 and FIG. 2, the controlling-computing unit 13 outputs a judgment signal 30 relating to the deterioration state, material composition or compound composition of the semiconductor process kit 2 under detection after the controlling-computing unit 13 compares the excited Raman spectrum signal 10 with a threshold of the Raman spectrum signals 20. For example, when the excited Raman spectrum signal 10 is lower than the threshold of the Raman spectrum signals 20, the judging signal 30 relates to a state that the semiconductor process kit 2 under detection is still usable, the remaining use hours (e.g. 100 hrs.) of the semiconductor process kit 2, or the deterioration percentage of the semiconductor process kit 2 under detection; when the excited Raman optical spectrum signal 10 is higher than the threshold of the Raman optical signals 20, the judging signal 30 relates to a state that the semiconductor process kit 2 under detection should not be used, or to the deterioration percentage of the semiconductor process kit 2 under detection.

Figure 5:
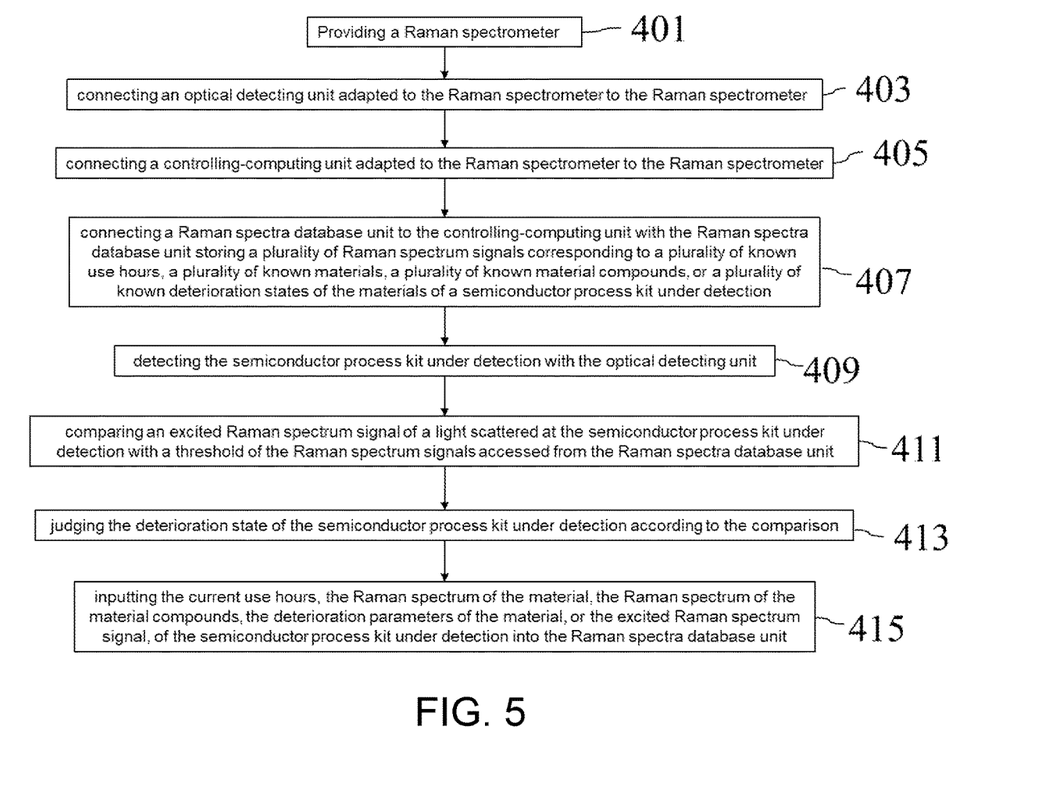
FIG. 5 is a flow chart showing a deterioration detecting method for semiconductor process kits according to another embodiment of the invention in the present application.

FIG. 5 is a flow chart showing a deterioration detecting method for semiconductor process kits according to another embodiment of the invention in the present application. Referring to FIG. 5, in another embodiment, the deterioration detecting method for semiconductor process kits may further includes a step 415 besides the steps 401 to 413 as shown in FIG. 4. The step 415 is inputting the current use hours of the semiconductor process kit under detection, the Raman spectrum of the material of the semiconductor process kit under detection, the Raman spectrum of the material compounds of the semiconductor process kit under detection, the deterioration parameters of the material of the semiconductor process kit under detection, or the excited Raman spectrum signal of the semiconductor process kit under detection into the Raman spectra database unit. In one embodiment, as shown in FIG. 1 and FIG. 2, each of the detected excited Raman spectrum signal 10 may be further inputted into the Raman spectra database unit 14 via the controlling-computing unit 13 to make each of the detected excited Raman spectrum signals 10 become one of the Raman spectrum signal 20 stored in the Raman spectra database unit 14. Besides, other data 40 including but not limited to the Raman spectrum corresponding to the current use hours of the semiconductor process kit 2 under detection, the deterioration parameter or percentage of the material of the semiconductor process kit 2 under detection, the material of the semiconductor process kit 2 under detection, or the material compound of the semiconductor process kit 2 under detection may be inputted into the Raman spectra database unit 14 by other means. In this case, the Raman spectrum data stored in the Raman spectra database unit 14 can be gradually accumulated. It is to be noted that the step order in the text is an exemplification but not a limitation to the invention. For example, the steps 401 to 413 are not all required to be implemented before implementing the step 415. The step 415 may be implemented without implementing in advance the step 413, or the step 415 may be implemented simultaneously with the step 413.

In summary, the proposed deterioration detecting system and method for semiconductor process kits described according to the present application utilize the optical detecting unit, the controlling-computing unit, and the Raman spectra database unit that are adapted to the Raman spectrometer to make detection. In this way, the deterioration state of the semiconductor process kits which has been used for a certain of hours, the deterioration state of the semiconductor process kits undergoing various degrees of material deterioration, the deterioration state of the semiconductor process kits having various materials or various material compounds, the material composition of the semiconductor process kits, and the material compound composition of the semiconductor process kits could be detected out in a precise and effective manner. Moreover, the current detecting results, the Raman spectrum corresponding to the material composition, the Raman spectrum corresponding to the material compound, and the material deterioration parameters may be further inputted into the Raman spectra database unit to serve as references for comparison and judgment in the next detection and thereby to increase the accuracy of the detection. Therefore, the proposed deterioration detecting system and method for semiconductor process kits have capability of precisely determining the good and bad of a semiconductor process kit to satisfy the high-end processing requirements.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation to encompass all such modifications and similar arrangement.

What is claimed is:

1. A deterioration detecting system used to judge deterioration state of a semiconductor process kit of a semiconductor production equipment, comprising:
   a Raman spectrometer;
   an optical detecting unit connected to the Raman spectrometer to guide a light beam emitted from the Raman spectrometer to be projected onto at least one targeted area of the semiconductor process kit and to guide a light scattered at the targeted area having an excited Raman spectrum signal to be received by the Raman spectrometer;
   a Raman spectra database unit provided to store a plurality of Raman spectrum signals corresponding to a plurality of known use hours of the semiconductor process kit, a plurality of known materials of the semiconductor process kit, a plurality of known material compounds of the semiconductor process kit, or a plurality of known deterioration states of the materials of the semiconductor process kit; and
   a controlling-computing unit connected to the Raman spectrometer and the Raman spectra database unit to receive the excited Raman spectrum signal from the Raman spectrometer, access the Raman spectrum signals stored in the Raman spectra database unit, compare the excited Raman spectrum signal with a threshold of the accessed Raman spectrum signals, and output a judgment signal relating to the deterioration state of the semiconductor process kit,
   wherein the targeted area is included in a plane of the semiconductor process kit where the highest deterioration rate occurs.

2. The deterioration detecting system of claim 1, wherein the semiconductor process kit is made of an inorganic material.

3. The deterioration detecting system of claim 2, wherein the inorganic material is selected from a group consisting of silicon, quartz, aluminum oxide, yttrium oxide, and yttrium aluminum garnet.

4. The deterioration detecting system of claim 1, further comprising:
   a display unit connected to the controlling-computing unit to receive the judgment signal and display a judgment result relating to the deterioration state of the semiconductor process kit according to the judgment signal.

5. The deterioration detecting system of claim 4, wherein the judgment result relating to the deterioration state of the semiconductor process kit is the semiconductor process kit is still usable, the semiconductor process kit should not be used, the remaining use hours of the semiconductor process kit, the deterioration percentage of the semiconductor process kit, the compound composition of the semiconductor process kit, or the material composition of the semiconductor process kit.

6. The deterioration detecting system of claim 1, wherein at least two targeted areas of the semiconductor process kit are projected with the light beam emitted from the Raman spectrometer.

7. The deterioration detecting system of claim 1, wherein the light beam projected to the targeted area focuses on a circular spot.

8. A deterioration detecting method used to judge deterioration state of a semiconductor process kit of a semiconductor production equipment, comprising:
   providing a Raman spectrometer;
   connecting an optical detecting unit adapted to the Raman spectrometer to the Raman spectrometer;
   connecting a controlling-computing unit adapted to the Raman spectrometer to the Raman spectrometer;
   connecting a Raman spectra database unit to the controlling-computing unit with the Raman spectra database unit storing a plurality of Raman spectrum signals corresponding to a plurality of known use hours of the semiconductor process kit, a plurality of known materials of the semiconductor process kit, a plurality of known material compounds of the semiconductor process kit, or a plurality of known deterioration states of the materials of the semiconductor process kit;

detecting a targeted area included in a plane of the semiconductor process kit where the highest deterioration rate occurs with the optical detecting unit; and comparing an excited Raman spectrum signal of a light scattered at the targeted area of the semiconductor process kit with a threshold of the Raman spectrum signals stored in the Raman spectra database unit.

9. The deterioration detecting method of claim 8, further comprising:

judging the deterioration state of the semiconductor process kit according to the comparison.

10. The deterioration detecting method of claim 8, further comprising:

inputting the current use hours of the semiconductor process kit, the Raman spectrum of the material of the semiconductor process kit, the Raman spectrum of the material compounds of the semiconductor process kit, the deterioration parameters of the material of the semiconductor process kit, or the excited Raman spectrum signal of the semiconductor process kit into the Raman spectra database unit.

\* \* \* \* \*